July 13, 1948.  W. J. MILLER  2,444,943
APPARATUS FOR FEEDING CLAY TO MOLDS IN THE
MANUFACTURE OF POTTERY DINNERWARE
Filed March 10, 1944  6 Sheets-Sheet 2

INVENTOR.
William J. Miller.
BY
George J. Croninger
ATTORNEY.

July 13, 1948. W. J. MILLER 2,444,943
APPARATUS FOR FEEDING CLAY TO MOLDS IN THE
MANUFACTURE OF POTTERY DINNERWARE
Filed March 10, 1944 6 Sheets-Sheet 4
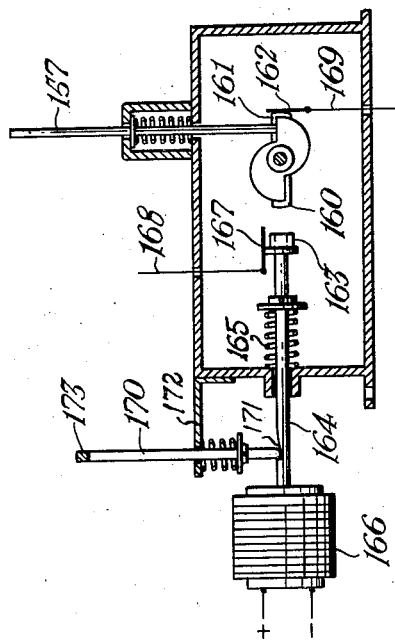
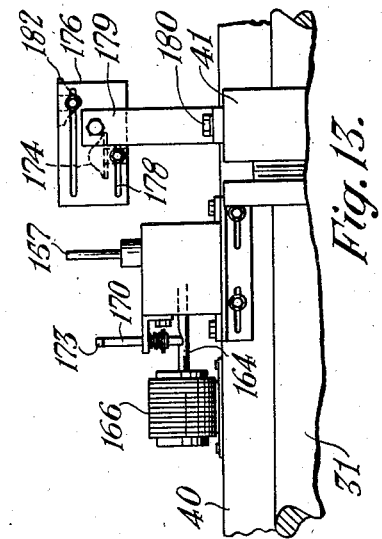
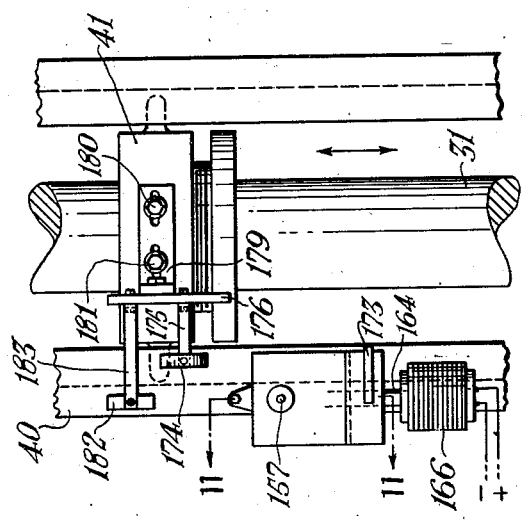
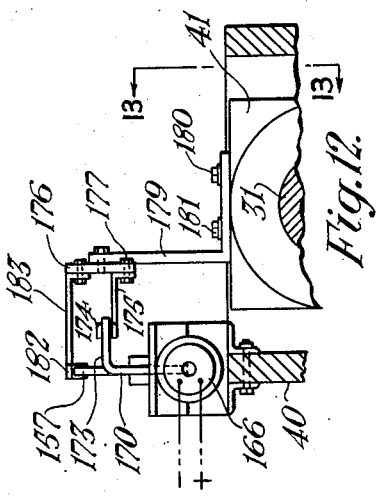
INVENTOR.
William J. Miller.
BY
George J. Croninger
ATTORNEY.

July 13, 1948. W. J. MILLER 2,444,943
APPARATUS FOR FEEDING CLAY TO MOLDS IN THE
MANUFACTURE OF POTTERY DINNERWARE
Filed March 10, 1944 6 Sheets-Sheet 5

INVENTOR
WILLIAM J. MILLER
BY
George J. Croninger
ATTORNEY

July 13, 1948.   W. J. MILLER   2,444,943
APPARATUS FOR FEEDING CLAY TO MOLDS IN THE
MANUFACTURE OF POTTERY DINNERWARE
Filed March 10, 1944   6 Sheets-Sheet 6

INVENTOR
William J. Miller.
BY
George J. Cumings
ATTORNEY

Patented July 13, 1948

2,444,943

UNITED STATES PATENT OFFICE 2,444,943

APPARATUS FOR FEEDING CLAY TO MOLDS IN THE MANUFACTURE OF POTTERY DINNERWARE

William J. Miller, Swissvale, Pa., assignor to Miller Pottery Engineering Company, Swissvale, Pa., a corporation of Pennsylvania Application March 10, 1944, Serial No. 525,830

25 Claims. (Cl. 25—103)

1

This invention relates to apparatus for feeding clay to molds in the manufacture of pottery dinnerware.

This application discloses subject matter also shown in the application to William J. Miller, Serial No. 518,079, now Patent No. 2,376,800, filed January 13, 1944.

In producing ware of this class by automatic machine wherein the molds are periodically presented at feeding and forming positions to receive clay and have the clay formed thereon into ware, it is highly desirable to establish and maintain high accuracy and uniformity in the amount or volume of clay feed to the molds in order to conserve clay, reduce wear and tear on equipment, and minimize the amount of scrap produced and the expense of disposal and reclamation thereof.

It has been customary heretofore to extrude clay from the nozzle of a pug mill to a cutting off position above the mold however the variation in the downward movement of the clay between periodic strokes of the cutting off wire produced considerable variation in the size and volume of clay contained in the individual charges of material. This was due mainly to the fact that the resistance of the clay to forward movement in a pug mill continuously varies.

To avoid this handicap, clay has been fed from the extrusion orifice of a pug mill into large capacity tubular metal containers. These containers were then transported to an hydraulic feeding apparatus and these connected to a feed tube leading to a cut off position where a periodically operated cut off wire severed charges therefrom. The clay was forced from the container into the feed tube under controlled pressure by an hydraulically actuated plunger.

Between fillings said tubes were transported to a washing station and internally cleaned of residual clay before being again attached to a pug mill for recharging. This system not only required considerable manual intervention in transporting the tubes from place to place, washing them out and connecting and disconnecting them but also involved quite a lot of extra equipment such as hoists, overhead tracks, clamps, and other appurtenances. In order to continuously supply the molds with clay, it was necessary to provide two separate feeders and to alternate the feed between two feeding positions, due to the enforced idleness of a feeder whilst the magazine was being replaced.

It is one object of this invention to feed uniform charges of clay continuously through a single outlet in a system involving the use of an hydraulic feeder and pug mill.

Another object is to combine as parts of a unitary, coordinated structure, a pug mill and an hydraulic feeder automatically operable as a unit to continuously supply uniform amounts of clay to pottery molds without manual intervention except to feed the pug mill with clay.

Apparatus constructed in accordance with these objectives comprises, broadly, a pug mill or extrusion machine employing the usual mascerating knives and extrusion screw, having outlets each directly connected to a chamber of large capacity associated with an hydraulic feeder. Clay is removed from each chamber by alternately actuated, automatically controlled plungers which force the clay under controlled pressure first from one chamber and then the other through a single outlet. Means are provided for automatically withdrawing the plunger from an empty chamber, cleaning said cylinder and recharging it whilst the other one is being emptied and, stopping the pug mill after the chamber has been filled and restarting it when the opposite chamber is ready to be filled.

Other objects and advantageous features will be noted in the following written description and accompanying drawings wherein like reference characters designate corresponding parts and wherein:

Figure 5 is a detail in vertical section of the plunger head and cleaning brush inside the clay chamber.

Figure 6 is a detail in section of a vacuum relief valve in the plunger head.

Figure 7 is an end elevation partly broken away of the cleaning brush.

Figure 8 is a plan view of the automatic control governing the pug mill.

Figures 9 and 10 are side elevations of cams associated with the control equipment of Figure 8.

Figure 11 is a vertical section through a switch box taken on line 11—11 of Figure 8.

Figure 12 is an end elevation, partly broken away and partly in section of the apparatus of Figure 8.

Figure 13 is a side elevation of the apparatus of Figure 8 taken in the direction of arrows 13—13 of Figure 12.

Figure 1:
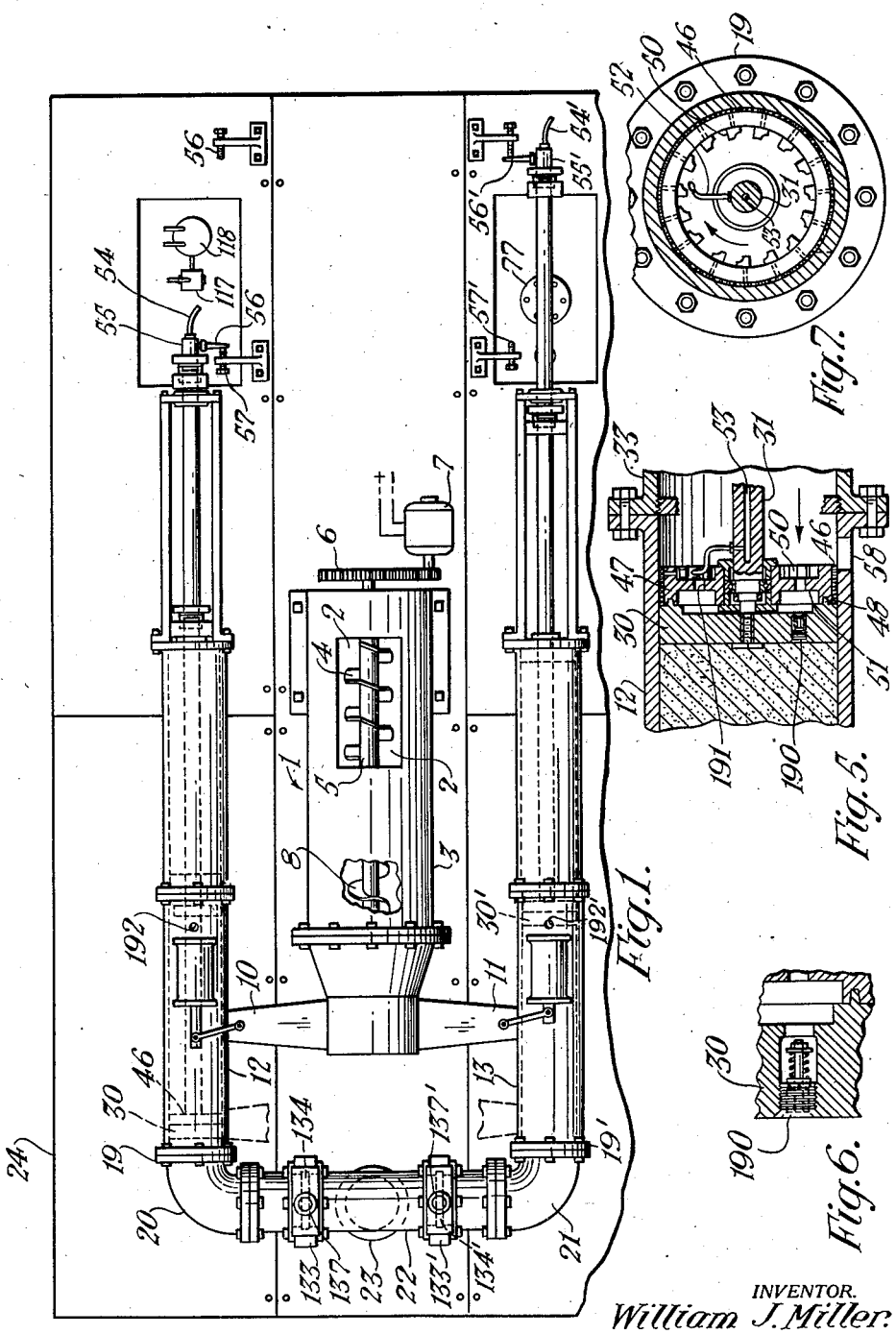
Figure 1 is a plan view of the preferred form of apparatus.
Figure 2:
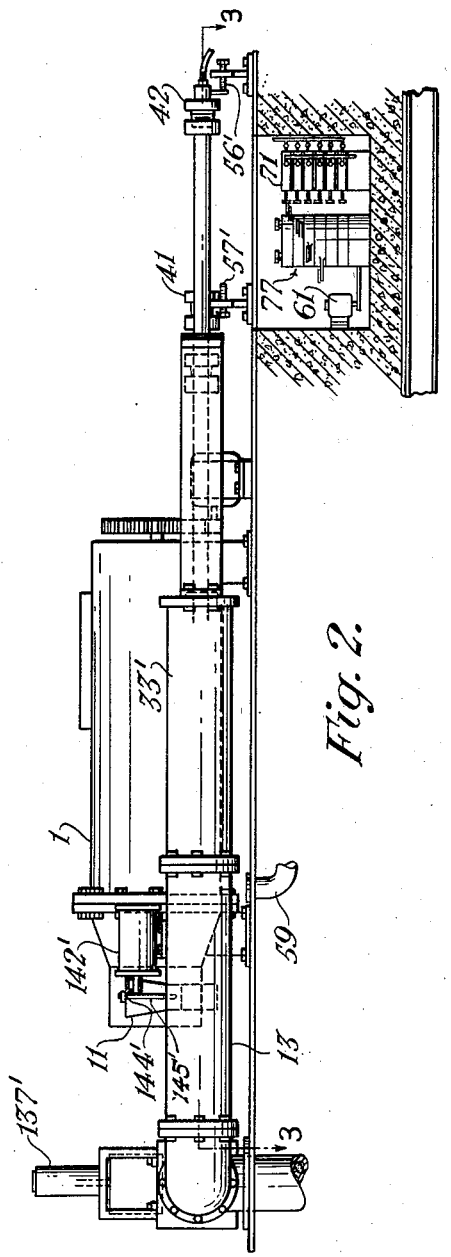
Figure 2 is a side elevation of the apparatus of Figure 1.

With reference to Figures 1 and 2, 1 is a pug mill having a filling opening 2 through which filter cakes are placed inside the hollow barrel 3. The knives 4 below the filling opening on shaft 5, rotated by gear 6 and motor 7, mascerate the cakes and push the material forward to the auger 8 on shaft 5. The auger plasticizes and homogenizes the material and forces it into a nozzle 9 having side outlets through which the clay is extruded into one or the other of a pair of oppositely disposed pipes 10 and 11. Pipe 10 is connected to and discharges into a tubular magazine 12 extending lengthwise of the pug mill and pipe 11 is connected to and discharges into a similar magazine 13 on the opposite side of the pug mill.

Figure 15:
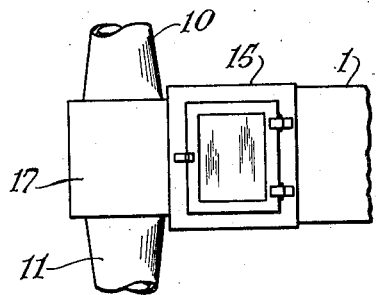
Figure 15 is a side elevation of the apparatus of Figure 14.
Figure 14:
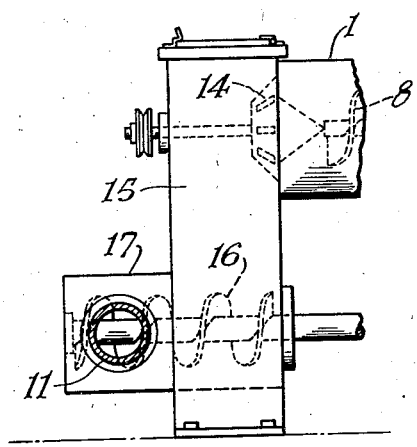
Figure 14 is a plan view of the outlet end of a vacuum pug mill.

If desired, the pug mill may be equipped to degasify the clay in which event the auger 8 would force the clay through a shredder 14, Figures 14 and 15, into a vacuum chamber 15 having an auger 16 at the bottom to compact and deliver the material into a nozzle 17 having side outlets to which the pipes 10 and 11 may be connected.

Pipes 10 and 11 may be round or rectangular in cross section and preferably taper from their entrance end toward their discharge ends, the amount and degree of taper depending on the length of the pipes and the rate of flow desired. Said pipes are angled downwardly from the pug mill nozzle to the lower level of the magazines 12 and 13 and are preferably connected to said magazines at or near a point equidistant from the ends thereof defined by hole 18, Figure 2, although the connection may be made just in rear of the pipe joint 19 at the forward end of each magazine for a purpose to be later explained.

Figure 16:
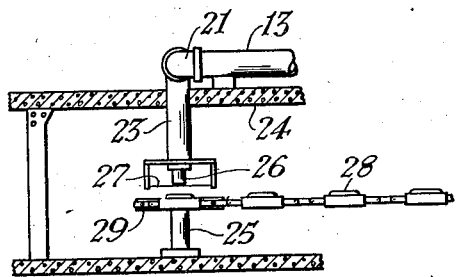
Figure 16 is a diagrammatic illustration showing how the clay is fed to the molds of a ware fabricating machine.

The forward end of each tubular magazine has an elbow 20 and 21, respectively, bolted thereto which are connected to the opposite ends of a T, 22, Figure 1, having a single downwardly extending branch 23, Figure 16, projecting through the floor 24 into a room therebelow in which the fabricating machine diagrammatically represented by the numeral 25, but of the type disclosed in my co-pending application supra, is located. A reducer 26 is screwed into the lower end of the branch and forms the discharge outlet of the feeding system. Said outlet is located above the fabricating machine at the feeding position and clay extruded therethrough is periodically cut off by wire 27 and deposited on molds 28 which the table 29 indexes with said outlet.

Magazines 12 and 13 may be of any desired diameter or length, however it is preferred that they be of such capacity as to accommodate ample clay for several mold charges.

To force clay out of the magazines 12 and 13, each has a plunger therein that travels therethrough and is preferably operated by hydraulic pressure. Since the apparatus for forcing clay out of magazine 12 is the same as that employed to force clay out of tube 13, only one of them will be described in detail and similar structure in the other apparatus will be identified by adding a prime exponent to the appropriate reference character.

Plunger 30 is connected to the forward end of rod 31 which passes through a hole in partition 32 screwed into cylinder 33 at the joint 34. A piston 35 is fixed on the rod and is moved forward through the cylinder by fluid entering the piston chamber through port 36 in end wall 37 and is moved rearwardly of the cylinder by fluid entering the piston chamber from in front through port 38 in partition 32. Piston rod 31 projects through a hole in wall 37 and is journaled in an end plate 39 joining spaced guides 40 which are bolted to the rear flange of cylinder 33.

Figure 3:
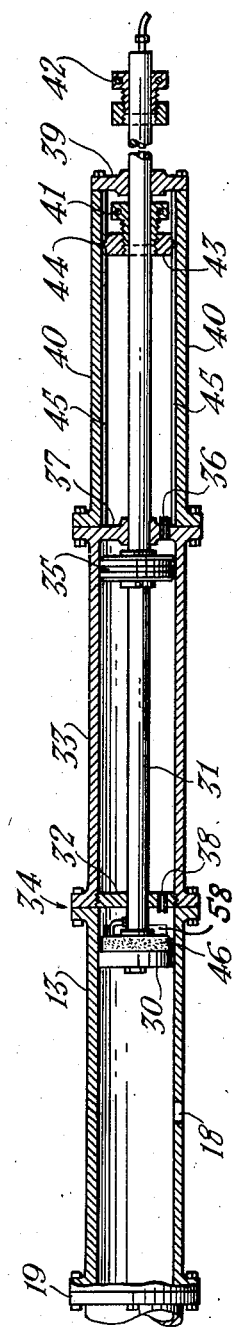
Figure 3 is an enlarged horizontal section through one of the feeders taken on line 3—3 of Figure 2.

Adjustably mounted on the rear end of rod 31, one on one side of plate 39 and the other on the other side thereof are two stop members 41 and 42, Figure 3, each comprising a hollow member sleeved on the rod having a tapered, threaded shank that is split lengthwise in order that the nut 43 may contract the shank around the rod to prevent displacement. Nut 43 of stop 41 has diametrically opposed pintles 44 which slide in grooves 45 in guides 40 to thereby prevent rod 31 from rotating. The setting of stop 41 determines the distance rod 41 may move rearwardly and the setting of stop 42 the distance the rod may move forwardly thereby controlling the stroke of the plunger 30.

Figure 4:
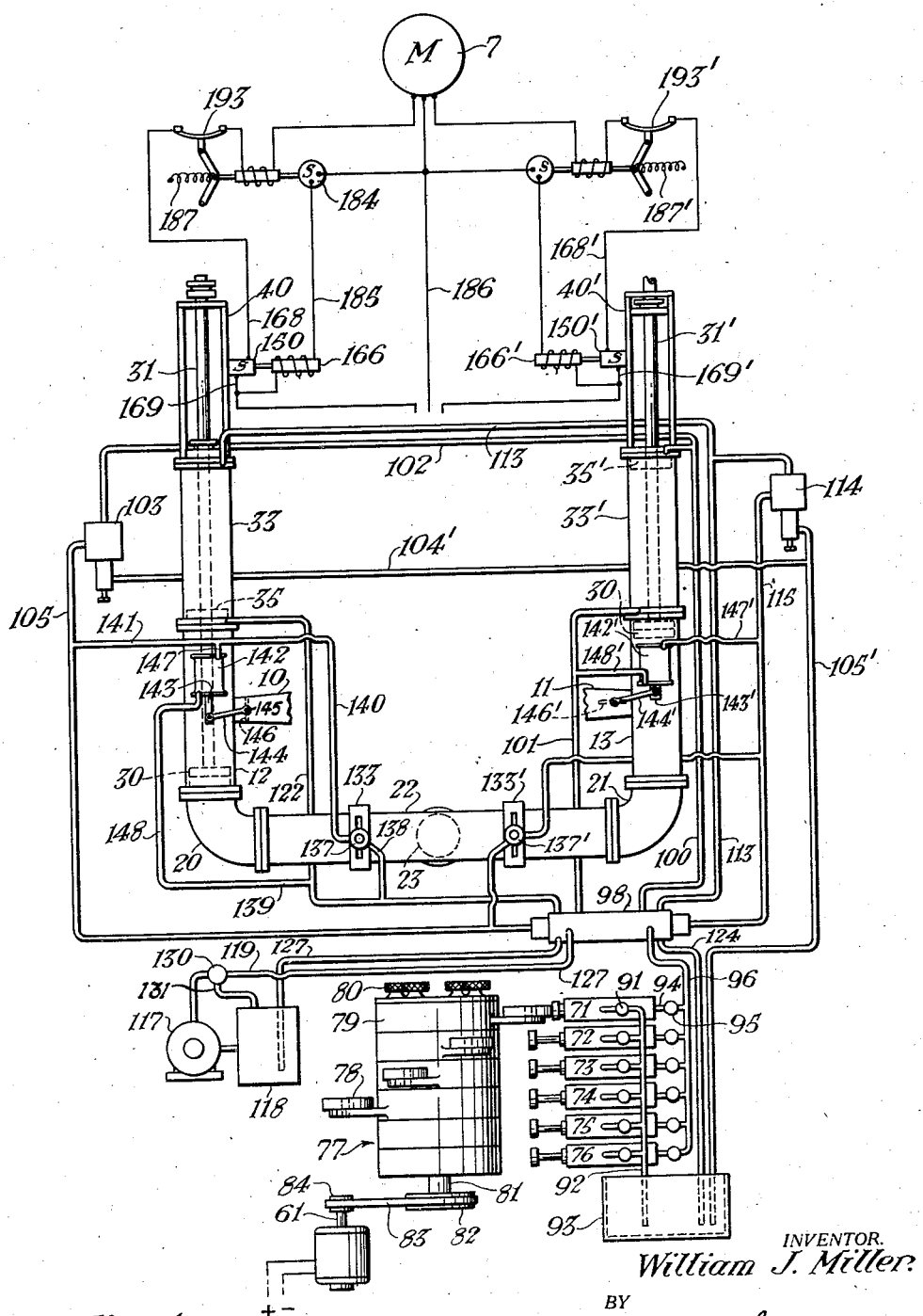
Figure 4 is a piping and wiring diagram illustrating the various circuits involved in the automatic control over feeding.

In order to remove the film of residual clay which clings to the interior of magazines 12 and 13 after emptying, a rotatable brush 46, Figure 4, is carried by the rod 31 directly behind the plunger 30, the flange of the brush ring 47 having a groove in which is received a circular tongue 48 projecting from the rear face of the plunger to assist in sealing off the shaft bearing 49 on which the brush rotates, from mud and water. In order to rotate the brush, it is formed with a plurality of spaced cup-like receptacles 50 on the under side of the ring 47 behind the apertured center rib 51. Cleaning fluid is forcefully projected against the receptacles through a high-pressure jet 52 screwed into a radial bore in rod 31 communicating with a longitudinal bore 53 through which water is conducted from a source of supply represented by flexible hose 54. A shut off valve 55 connected to the bore 53 and hose 54 has an operating lever 56 to be actuated by an adjustable stop 57, Figures 1 and 2, as the rod 31 approaches its forward limit of movement to open the valve and start the brush rotating. As the rod 30 is pulled back, the slurry is washed toward a drain hole 58 in the bottom of the magazine at the rear thereof and discharged into a drain 59 therebelow. As the rod 30 approaches its rearmost limit of movement, the valve operating lever 56 is engaged by another adjustable stop 60 which closes valve 55 thereby interrupting the flow of cleaning fluid and stopping the rotation of brush 46.

The plungers 30 and 30' are preferably moved forwardly alternately in their respective magazines by hydraulic pressure. For this purpose there is provided the system and apparatus shown in Figure 4 which also includes means for automatically controlling the starting and stopping of the pug mill motor 7.

Said hydraulic system comprises a vertical series of six pumps, 71, 72, 73, 74, 75 and 76 to be actuated by a timer 77 having cam rollers 78 mounted on the periphery of cam rings 79 that are angularly adjustable while in operation by means of control knobs 80 as is customary in timers of this type. These pumps control the amount of clay extruded through the feed tube and regulate the volume of clay contained in individual charges. The rings 79 are rotated together and continuously by means of shaft 81, sprocket 82, and chain 83, connected to a sprocket 84, on motor shaft 61. The pumps are vertically positioned one above the other and may, if desired, be spaced circumferentially around the timer.

Figure 18:
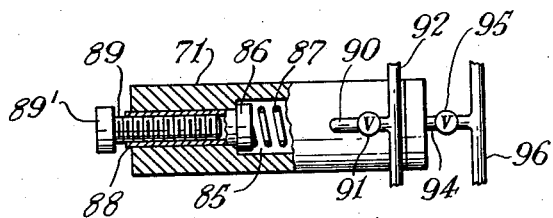
Figure 18 is a detail, partly in section of a pump incorporated in the hydraulic system.

Each pump comprises a piston chamber 85, Figure 18, having a piston 86 therein and return spring 87. The piston rod 88 is hollow and threaded to receive a screw 89 which may be screwed outwardly until the head 89' is engaged by one of the cam rollers 78 and then adjusted to regulate the stroke or screwed entirely in to render the pump inoperative. The inlets of all pumps in a set are connected by branch lines 90, each having a check valve 91 therein, to a main header 92 leading to a tank 93 containing hydraulic fluid. The outlets of all pumps in a set are connected by branch lines 94, each having a check valve 95 therein, to a main header 96 leading to port 97 of a valve 98, Figure 4, operable to automatically discontinue the clay pumping action of one clay ram, for instance 35, when the magazine with which it is associated is emptied of clay and start the other ram 35'. This is accomplished in the following manner:

The pressure fluid pumped into header 96, Figures 4 and 18 by each individual pump forces fluid in the line through port 97 of valve 98 and thence through open port 99 between movable discs 108 and 109 into pipe 100 leading to the piston cylinder 33'. As piston 35' advances in cylinder 33', fluid is forced out of said chamber through line 101 and open port 110' into the valve chamber between movable disc 128 and the stationary central dividing wall 138 of valve 98, and then into passage 126' and out through port 126 into a return line 127 leading to tank 118.

Figure 19:
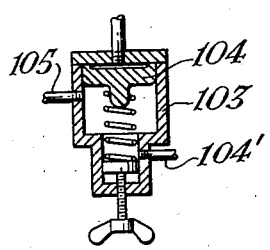
Figure 19 is a detail in section of a control valve incorporated in the hydraulic system.

When the piston 35' reaches its forward limit of travel in cylinder 33' port 38' and line 101 is closed by the piston 35' and the increase in fluid pressure in line 100 thereupon acts to increase the fluid pressure in line 102 leading to adjustable valve 103, Figure 19, and opens valve 103 by depressing piston 104 against adjustable spring tension thereby opening outlet line 105 leading to piston chamber 106, in the left end of the housing of valve 98. Fluid in the lower part of valve 103 that is displaced by piston 104 enters line 104' leading to return line 105' and tank 93. Pressure fluid entering chamber 106 shifts piston rod 107 to the right thereby causing disc 108 fixed thereon to move to the right of port 99 and disc 109 to move to the right of port 110 thereby establishing communication between line 113 leading to the piston cylinder 33 and port 97 connected to pump line 96.

As piston 35 advances in cylinder 44, fluid is forced out of the chamber through port 38 into line 122 into the chamber between disc 125 and the end wall 125' of valve 98 and then into passage 126' and port 126 into return line 127. When piston 35 reaches its limit of forward movement the increased pressure in line 113 opens pilot valve 114 (having the same construction as valve 103, Figure 19) permitting fluid under pressure in line 115 to flow into piston chamber 116, and shift piston rod 107 to the left to again connect line 100 to pressure pumps 71—76 and move piston 35' forwardly in cylinder 33'.

Figure 17:
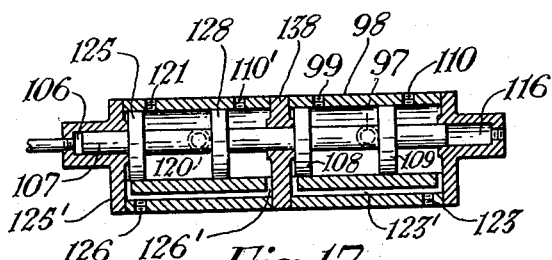
Figure 17 is a detail in horizontal suction of a pilot valve incorporated in the hydraulic system.

To retract piston 35 in its cylinder 33 when the feed is switched to cylinder 33' a motor driven pump 117, Figure 4, forces fluid from tank 118 into line 119 leading to port 120 in valve 98 and thence through port 121 into line 122 leading to cylinder 33. This forces piston 35 to the opposite end of cylinder 33. The fluid on the opposite side thereof being forced through line 113 and port 110 into valve 98 and then through passage 123' and port 123 into line 124 which discharges into tank 93. When the feed is changed from piston 35' to piston 35 the movement of piston rod 107 to the right, Figure 17, shifts disc 109 to the right of port 99 permitting back flow of fluid through line 100, port 99, passage 123', port 123 and return line 124 to tank 93. When piston 11' or 11, either one, reaches the limit of its rearward stroke the increase in pressure in the line 119 opens relief valve 130 and by-passes fluid from the pump into tank 118 through line 131.

Figure 20:
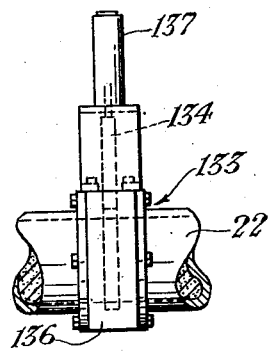
Figure 20 is a view illustrating a gate valve incorporated in each of the clay conduits.

While clay is being discharged from one tube, for instance tube 13, the other one is closed to back flow of material thereinto by a gate 133 Figures 4 and 20 mounted in the horizontal section of the T 22 between the elblow 20 and the downwardly extending branch 23, Figures 1, 2, and 20. A similar gate 133' is installed on the opposite side of the T to prevent backflow into tube 13 when the other tube is discharging.

Said gate valves may be of any suitable construction however it is preferred to employ a unitary type having a rectangular closure 134 slidable vertically in vertical guide ways in a casing 136. Vertically positioned hydraulic cylinders 137 and 137'; Figures 2, 4 and 20, one for each gate, are mounted thereover to actuate the closures. The upper end of cylinder 137 is connected by pipe 138 to a fluid line 139 connected to pipe 115 so that the gate will be closed when piston 35 reaches the limit of its forward stroke and the increase in pressure in line 113 causes valve 114 to open. The lower end of cylinder 137 is connected by pipe 140 to line 141 connected to pipe 105 so that the gate will be opened when piston 35' reaches the limit of its backward stroke and the increase in pressure in line 102 causes valve 103 to open and cause pressure fluid to enter line 105. The upper end of cylinder 137' is connected by pipe 140' to line 115 so that it will be actuated to close gate 133' simultaneously with the opening of gate 133. The lower end of cylinder 137' is connected by pipe 138' to line 105 so that it will open gate 133' simultaneously with the closing of gate 133.

It is desired to close pipe 10 during the interval that plunger 30 is advancing in tube 12 so as to prevent the back extrusion of clay into pipe 10 as the plunger commences to move forwardly or to prevent the extrusion of clay into cylinder 12 by the pug mill 1 after the plunger has passed the outlet end of pipe 10. The same applies to pipe 11. Thus, an hydraulic cylinder 142, Figure 4, is mounted on top of cylinder 12 and the piston rod 143 thereof is connected by a link 144 to an operating stem 145 attached to a rotatable closure 146 at the outlet end of pipe 10. Hydraulic cylinder 142' mounted on top of cylinder 13 is similarly connected, the parts being identified by the same reference characters with prime exponents. The rear end of cylinder 142 is connected by line 147 to pipe 141 so that pipe 10 will be closed when piston 35 reaches forward limit of its stroke. The forward end of cylinder 142 is connected by line 148 to pipe 139 so that pipe 10 will be opened as soon as piston 35 commences to move rearwardly in cylinder 33. The forward end of cylinder 142' is connected by line 148' to line 101 so that pipe 11 will be opened as soon as piston 35' commences to move back in cylinder 33' and the rear end of cylinder 142' is connected by line 147' to pipe 115 so that pipe 11 will be closed when piston 35 reaches its forward limit of travel. Stating the operation in another way, when tube 12 is emptied of clay, pipe 10 is opened to permit refilling by the pug mill and is closed just prior to or simultaneously with the switching of the feed from tube 13 to tube 12. Valves 10 and 11 are not operated simultaneously.

In order to allow ample time for filling an exhausted tube with clay, pistons 35 and 35' are moved rearwardly in their respective cylinders at a rapid pace. Since an empty tube may be filled with clay by the pug mill in a shorter space of time than required to empty it, the pug mill is automatically shut down when the capacity of the tube being filled is reached and is automatically restarted after the tube has been emptied and the plunger has reached and passed by the clay inlet as it moves rearwardly in the tube. Thus, when plunger 30 of tube 12 moves rearwardly past the outlet end of pipe 10, the pug mill is automatically started and when the tube is filled with clay, the pug mill is stopped until the opposite plunger 30' moves rearwardly past the outlet end of tube 11 when it is restarted to fill tube 13, the operation of the valves 146 and 146' being co-ordinated with the operation of the pug mill to the extent that the proper valve is opened to permit the tube that is empty to be filled as the pug mill starts up.

To operate the pug mill in the automatic fashion aforesaid, a switch 150 is attached to the inside one of the two guides 40 at the rear of cylinder 33 and similar switch 150' attached to the inside guide bar 40' at the rear of cylinder 33'. These switches are positioned so as to be actuated to effect the energization of motor 7 when the plunger 30 or the plunger 30' moves rearwardly past the outlet end of pipes 10 and 11 respectively.

Said switch comprises a box 151 which is slidably clamped to bar 41 to enable adjustment by loosening bolts 152 received in elongated slots 153 formed in depending flanges 154 which straddle the bar. Inside the box is a rotatable switch member 155 on horizontal shaft 156 to be rotated by depressing vertical rod 157 slidable in boss 158 against the tension of spring 159. Said switch member 155 has two contacts 160 and 161, spaced 180° apart, one of which is adapted to engage stationary contact 162 every other reciprocation of rod 157.

163 is another contact member mounted on a horizontally reciprocable rod 164 movable into and out of engagement with one or the other of contacts 160 and 161 (depending on which one is in position) by coil spring 165 and solenoid 166 respectively. An elongated contact member 167 is slidably engaged by contact 163 in order that a circuit between wires 168 and 169 may be established when contact 163 is in engagement with either one of contacts 160 and 161 for a purpose to be hereinafter described.

When contact 163 is pulled away from switch member 155 by solenoid 166 to interrupt the circuit the lower end of a vertically positioned keeper 170 is forced into a notch 171 in rod 164 to hold rod 164 in retracted position and open the circuit for a given period of time. To prevent turning rod 170 is rectangular in cross section and reciprocates in a rectangular hole in bracket 172, the upper end of the rod being turned inwardly 90° as at 173 toward shaft 31, Figure 12 in position to be engaged and lifted by a cam 174, Figures 8, 9, 10, 12 and 13 traveling with shaft 31.

Cam 174 is mounted on a horizontal bracket 175 attached to a vertical plate 176 by bolt 177 received in a horizontal slot 178 therein, thus permitting horizontal adjustment of the cam lengthwise the plate. Said plate is attached to an L-shaped bracket 179 which is bolted to the top of stop 41 on shaft 31, by bolts 180 received in elongated slots 181 to enable horizontal adjustment toward and away from the switch. The working surface of cam 174 is turned upwardly and is so developed as to lift rod 170 by the handle 173 as it passed therebelow when traveling in either direction.

Another cam 182, vertically and horizontally spaced from cam 174 is provided to actuate rod 157. Said cam is mounted on a bracket 183 adjustably attached to plate 176. The working surface of cam 182 is turned downwardly and is so developed as to depress rod 157 as it passed thereabove when traveling in either direction.

Cams 174 and 182 are horizontally spaced apart on plate 176 a distance which will enable cam 182 to engage and depress rod 157 prior to the time cam 174 lifts rod 170 when the plunger, for instance plunger 30 is moving forwardly in magazine 12.

With reference to Figure 4, switch 150 is included in a motor circuit wherein line 168 leading to motor 7 has an overload circuit breaker 193 therein. The circuit breaker is intended to actuate a switch 184 controlling solenoid 165 in line 185 leading from power line 186 to the other power line 169. Switch 150' is included in a similar circuit designated by the same numerals having prime exponents, except that power line 186 is common to both circuit.

In operation, assuming that the pug mill 1 is at rest and plunger 30' is fully retracted in readiness to move forwardly in magazine 13 and plunger 30 has just reached the forward limit of its stroke, then, in response to an increase in pressure in line 113, the pilot valve 98 causes pump pressure to be switched from cylinder 33 to cylinder 31' thus advancing plunger 30' forwardly in its magazine. Plunger 30 is then moved rearwardly in magazine 33 and as it passes the outlet end of pipe 10, which has been previously opened, cam 182 depresses rod 157 to thereby close the circuit to the pug mill motor 7 thereby starting the pug mill and causing clay to be fed into magazine 12. Plunger 30 is withdrawn to the rear end of the magazine and when the magazine becomes filled with clay, the increased load on the motor, due to the increase in resistance offered to the rotation of the pug mill auger, causes the circuit breaker 183 to open line 168 and thus de-energize motor 7. At the same time, switch 184 is closed which energizes solenoid 166 and caused rod 164, Figure 11, to be pulled back thus opening the circuit between lines 169 and 168. When rod 164 is pulled back, keeper 170 drops into notch 171 to hold rod 164 in retracted position when solenoid 166 is de-energized which occurs as soon as the circuit breaker is closed again by spring 187 which opens switch 184. Switch 150 being open however, the motor circuit is not energized by the reclosing of the circuit breaker.

After plunger 30' has forced all the clay out of magazine 13, and the feed has been switched to magazine 12, plunger 30 starts to move forward in magazine 12 and as cams 174 and 182 approach switch 150, cam 182 first depresses rod 182 to turn switch points 160–161 to a neutral position and then cam 174 lifts the tip of rod 170 out of notch 171 permitting rod 164 and contact 163 to move back to a position where the contact will be engaged by contact 160 or 161 when rod 182 is again depressed by cam 182 when it returns. Cam 174 merely lifts and lowers rod 157 upon the return trip without effecting any other operation, notch 171 being at this time in the forward position. Thus as plunger 30 advances in magazine 12, plunger 30' is retracted in magazine 13 and as the plunger comes opposite the outlet end of pipe 11' motor 7 is energized by switch 150' to cause the pug mill to feed clay into magazine 13, the motor being automatically shut off and switch 150' reset in the manner previously described.

Plungers 30 and 30' are each provided with a vacuum release valve 190, Figure 5, which automatically opens as the plungers are withdrawn in their respective magazines to allow air to be drawn into the space ahead of the plunger. The brush wheel disc is pierced with holes 191 to admit air to the valve 190. In order to vent the magazines whilst they are being filled with clay a hole 192 of appropriate size is drilled in each magazine just ahead of the point where the front face of each plunger 30 or 30' stops when at the rearmost limit of its stroke. As the plunger starts forward, the hole is closed by the plunger to prevent the escape of any appreciable quantity of clay and, of course, as the plunger passes forwardly beyond the hole it ceases to function as a vent. Any clay which may plug the hole will be blown out as the magazine by the compressed air within the magazine then it is filled with clay by the pug mill. The hole is of insufficient diameter to act as a clay pressure relief valve such as would preclude the functioning of the overload circuit.

The apparatus hereof is capable of being operated in another fashion to feed clay.

The present system, on a reduced scale, may be employed to feed consecutive charges of clay by causing first one plunger to deliver a feeding impulse and then the other. In this connection, capacity of each of the magazines 12 and 13 would be equal to or slightly more than the amount of clay contained in a single charge. The outlet end of the pipes 10 and 11 would preferably be connected to the forward end of each magazine as illustrated in dotted lines in Figure 4, and the pug mill would run continuously rather than intermittently. It will be understood that in such an arrangement the use of the motor controlling circuits would not be necessary since the pug mill would operate continuously.

I claim:

1. Apparatus for feeding plastic ceramic material to a machine for making dinnerware and the like comprising a tubular conduit mounted in fixed position leading to said machine and including a magazine section to be filled to capacity with said material having a side inlet through which plastic material is discharged thereinto, a plunger in said magazine co-axial therewith, means for moving said plunger forwardly through said magazine section to empty the magazine and force the material out through said conduit, a plastic material pugging and extruding means having a deairing chamber provided with a discharge outlet and a conduit connected to the magazine inlet and the deairing chamber discharge outlet for conducting pugged material to said magazine.

2. Apparatus for feeding plastic ceramic material to a machine for making dinnerware and the like comprising a tubular conduit mounted in fixed position leading to said machine and including a magazine section to be filled to capacity with said material having a side inlet through which plastic material is discharged thereinto, a plunger in said magazine co-axial therewith, means for moving said plunger forwardly through said magazine section to empty the magazine and force the material out through said conduit, a plastic material pugging and extruding means provided with a deairing chamber having a discharge outlet, and a pipe connecting the outlet of the deairing chamber with the inlet of the magazine.

3. Apparatus for feeding plastic ceramic material to a machine for making dinnerware and the like comprising a tubular conduit mounted in fixed position leading to said machine and including a magazine section to be filled to capacity with said material having a side inlet through which plastic material is discharged thereinto, a plunger in said magazine co-axial therewith, means for moving said plunger forwardly through said magazine section to empty the magazine and force the material through the conduit and rearwardly therein when the magazine is emptied, means for pugging and extruding plastic material having a deairing chamber provided with a discharge outlet, a pipe connecting the discharge outlet of the deairing chamber and the inlet to the magazine section, mechanism for actuating said pugging and extruding means and means for controlling the operating of said mechanism operable upon movement of the plunger rearwardly in said magazine.

4. Apparatus for feeding plastic ceramic material to a machine for making dinnerware and the like comprising a tubular conduit mounted in fixed position leading to said machine and including a magazine section to be filled to capacity with said material and having a side inlet through which said material is discharged thereinto, a plunger in said magazine co-axial therewith, means for moving said plunger forwardly through said magazine section to empty the magazine and force the material through the conduit and rearwardly therein to enable said magazine to be refilled, means for pugging and extruding plastic ceramic material having a de-airing chamber provided with a discharge outlet and a pipe connecting the discharge outlet of the de-airing chamber and the inlet to the magazine section.

5. Apparatus for feeding plastic ceramic material to a machine for making dinnerware and the like comprising a tubular conduit mounted in fixed position leading to said machine and including a magazine section to be filled with said material having a side inlet, a plunger in said magazine co-axial therewith, means for moving said plunger forwardly through said magazine section to force material through the conduit and rearwardly therein to enable said magazine to be refilled, means for pugging and extruding plastic ceramic material having a discharge outlet directly connected to and in closed communication with said inlet, mechanism for driving said pugging and extrusion means and control means for rendering said mechanism inoperable in response to an increase in the pressure of the material in said magazine when the capacity of said magazine is reached.

6. Apparatus for feeding plastic material to a mold charging station comprising a conduit mounted in a fixed position leading to said station including a tubular magazine section to be filled to capacity with clay having a side inlet through which plastic material is discharged therewith, a co-axial plunger in said magazine section, means for moving said plunger forwardly through said magazine section to empty the magazine and force the said material out through the conduit, clay pugging and extrusion means having a deairing chamber provided with a discharge outlet, a conduit connected to the discharge outlet of the deairing chamber and the inlet to the magazine through which clay is discharged from the deairing chamber into the magazine and means operable to start the clay pugging and extruding action of the pugging means upon withdrawal of said plunger in said magazine to a point where the inlet is in front of said plunger.

7. Apparatus for feeding plastic material to a mold charging station comprising a conduit mounted in fixed position leading to said station having a tubular magazine section to be filled to capacity with said material provided with a side inlet, a plunger in said magazine to be moved forwardly therethrough to empty the magazine and force material out through said conduit, clay pugging and extrusion means provided with a deairing chamber having a discharge outlet, a pipe connecting the discharge outlet of the deairing chamber and the inlet to the magazine and means operable to actuate said means and the plunger alternately, independently of each other.

8. Apparatus for feeding plastic material to a mold charging station comprising a pair of conduits mounted in fixed position each having an outlet leading to a mold charging station and a magazine section to be filled with clay provided with an inlet, a plunger in each magazine to be moved forwardly therethrough to force clay through said conduits, clay pugging and extrusion means directly connected to said magazine so as to discharge clay directly thereinto and means operable to actuate said plungers alternately independently of each other and the clay pugging and extrusion means alternately independently of one and then the other of said plungers.

9. Apparatus for feeding plastic material to a mold charging station comprising a pair of conduits mounted in fixed position each having an outlet leading to a mold charging station and a magazine section to be filled with clay each having an inlet, a plunger in each magazine to be moved forwardly therethrough to force clay through said conduits, a pug mill having discharge outlets connected to said magazines, means for alternately independently moving said plungers forwardly through said magazines and means for alternating the discharge of clay through first one outlet and then the other.

10. Apparatus for feeding plastic material to molds comprising a pair of conduits each having an outlet leading to a mold charging station and a tubular magazine section to be filled with clay, a plunger in each magazine to be moved forwardly therethrough to force clay through said conduits, an inlet in each magazine, a pug mill having discharge outlets, a pipe connecting each magazine inlet with a pug mill discharge outlet, means for moving first one, then the other of the plungers forwardly in their respective magazines and means for alternating the flow of material through first one and then the other of the pipes whereby material is forced out of one magazine whilst the other is being filled.

11. Apparatus for feeding plastic material to molds comprising a pair of conduits each having an outlet leading to a mold charging station and, a tubular magazine section to be filled with clay a plunger in each magazine to be moved forwardly therethrough to force clay into said conduits, an inlet in each magazine, a pug mill having discharge orifices, a pipe connecting each magazine with a pug mill orifice, means for moving first one, then the other plunger forwardly through their respective magazines, means for alternating the flow of material through first one and then the other of the pipes whereby material is forced out of one magazine whilst the other is being filled and means for interrupting the operation of the pug mill when the capacity of a magazine being charged has been reached.

12. Apparatus for feeding plastic material to molds comprising a pair of conduits each having an outlet leading to a mold charging station and a tubular magazine section to be filled with clay, a plunger in each magazine to be moved forwardly therethrough to force clay into said conduits, an inlet in each magazine, a pug mill having discharge outlets, a pipe connecting each magazine with a pug mill outlet, means for moving first one, then the other plunger forwardly through their respective magazines and means for alternating the flow of material through first one and then the other of the pipes whereby material is forced out of one magazine whilst the other is being filled, means for interrupting the operation of the pug mill when the capacity of a magazine being filled has been reached and means for restoring the pug mill when the other magazine after the other magazine has been emptied.

13. Apparatus for feeding plastic material to molds comprising a pair of conduits each having an outlet leading to a mold charging station and a tubular magazine section a plunger in each magazine to be moved forwardly therethrough to force material out of said magazines into said conduits, a rod connected to each plunger, a piston attached to each rod, a cylinder housing each piston, an inlet in each magazine, a pug mill connected with each inlet so as to discharge plastic material into each magazine, means for alternately introducing fluid under pressure into each cylinder to cause the plungers to alternately move forwardly through said magazines and means for alternating the discharge of clay from the pug mill through first one and then the other of the magazine inlets.

14. Apparatus for feeding plastic material to machinery for forming dinnerware and the like which comprises a conduit leading to said machine, a cylinder spaced from said conduit in alignment with its inlet and, a piston in said cylinder, a rod connected to said piston and projecting from said cylinder, a plunger on the outer end of said rod, a tubular magazine encompassing said plunger mounted in co-axial alignment with conduit inlet, means for introducing fluid under pressure into said cylinder to cause the plunger to move forwardly through said magazine, and thereby empty the magazine and force plastic material out through said conduit, an inlet in said magazine, a pug mill having a deairing chamber provided with a discharge outlet, a pipe connecting the discharge outlet with the magazine inlet and means operable to interrupt the discharge of clay through said pug mill outlet whilst the plunger is moving forwardly in said magazine.

15. Apparatus for feeding plastic clay to molds comprising a pair of magazines arranged in side by side relation, each to be alternately filled with clay in situ, a pug mill therebetween arranged to discharge directly into both of said magazines, a plunger in each magazine, means for advancing each plunger, alternately independently through each magazine to force clay therefrom and means for co-ordinating the operation of the pug mill with the movement of the plungers so as to commence to fill an empty magazine with clay whilst the other one is being emptied of clay.

16. Apparatus for feeding plastic material to a mold charging station comprising a pair of magazines each having an outlet a pipe common to both magazines connected to said outlets, said pipe being provided with a discharge orifice leading to said charging station, a pug mill arranged to alternately discharge clay, into one and then the other of said magazines, a plunger in each magazine, a valve in said pipe between each magazine and the discharge orifice, means for alternately independently moving said plungers forwardly through their respective magazines and means operable to open the valve associated with a given magazine when the other magazine is emptied of clay and to close the valve associated with said other conduit.

17. Apparatus for feeding plastic material to a mold charging station comprising a pair of magazines each having an outlet and an inlet, a pug mill having discharge orifices, a pipe connecting each inlet with a discharge orifice, a valve in each pipe, a plunger in each magazine, means for alternately advancing each plunger through its respective magazine to force material therefrom and means operable to close the valve associated with a magazine that is being emptied and open the valve associated with the other magazine to divert the flow of material issuing from the pug mill into the empty magazine.

18. Apparatus for feeding plastic material to a mold charging station comprising a conduit leading to a mold charging station, said conduit having a magazine section to be filled with plastic material, a plunger in said magazine to be moved forwardly therethrough to force said material from said conduit, means for moving said plunger forwardly and rearwardly in said conduit, and means, movable with said plunger for cleaning the interior of said conduit of residual material.

19. Apparatus for feeding plastic material to a mold charging station comprising a conduit leading to a mold charging station, said conduit having a magazine section to be filled with plastic material, a plunger in said magazine to be moved forwardly therethrough to force said material from said conduit, means for moving said plunger forwardly and rearwardly in said conduit, a revolvable brush movable with said plunger for cleaning the interior of said magazine of residual material, means for flushing out the interior of the magazine and means for controlling the operation of the brush and the flushing means.

20. Apparatus for feeding plastic material to a dinnerware fabricating machine comprising, a pair of conduits mounted in fixed position leading to said machine, each conduit having a magazine section to be filled with said material, a plunger in each conduit for forcing material therefrom, means movable with each plunger for cleaning the interior of each magazine of residual material, and means for operating each cleaning means alternately, independently of the other.

21. Apparatus for feeding plastic material to a dinnerware fabricating machine comprising a tubular conduit mounted in fixed position having a magazine section provided with a side inlet in the zone of the forward end of said magazine, a plunger in said magazine to be moved forwardly therethrough to empty the magazine and force said material from said conduit, means for moving said plunger forwardly and rearwardly therein, a pug mill having a deairing chamber having a discharge outlet, a pipe connected to the discharge outlet of the deairing chamber and the magazine inlet, and means for driving said pug mill to fill the magazine from the front end when the plunger is retracted.

22. Apparatus for feeding plastic material to a dinnerware fabricating machine comprising a pair of tubular members mounted in fixed position leading to said machine to be filled with plastic material, a pug mill directly connected to both tubular members and adapted to feed alternately into one and then the other, a drive for said pug mill a plunger in each member, each plunger to be moved forwardly alternately, independently of the other, means for moving said plungers forwardly and rearwardly in said members, electro-magnetic means for controlling the operation of said pug mill drive and fluid pressure responsive means for controlling the operation of said plunger actuating means.

23. Apparatus for feeding plastic ceramic material to a machine for making dinnerware and the like comprising a tubular conduit mounted in fixed position leading to said machine and including a magazine section to be filled to capacity with said material having a side inlet through which plastic material is discharged thereinto, a plunger in said magazine co-axial therewith, means for moving said plunger forwardly through said magazine section to empty the magazine and force the material through said conduit, a deairing chamber having a discharge outlet and a conduit connected to the discharge outlet, formed in position so as to discharge clay from the deairing chamber directly into the magazine inlet pug mill having a discharge inlet and a conduit connected to said outlet, formed and positioned so as to discharge clay directly into said inlet.

24. Apparatus for feeding plastic ceramic material to a machine for making dinnerware and the like comprising, a tubular conduit mounted in fixed position leading to said machine, said conduit including the magazine section to be filled with said material, said magazine section having a side inlet through which plastic material is discharged thereinto, a plunger in said magazine, means for moving said plunger forwardly through said magazine section to empty the magazine and rearwardly therein to permit refilling thereof, a pug mill connected to the inlet, means for actuating the pug mill, and means for interrupting the discharge of plastic material from the pug mill into the magazine when the plunger is moved forwardly through the magazine section.

25. Apparatus for feeding plastic ceramic material to a machine for making dinnerware and the like comprising, a tubular conduit mounted in fixed position leading to said machine, said conduit including a magazine section to be filled with ceramic material, said magazine section having an inlet through which plastic material is discharged thereinto, a plunger in said magazine, means for moving said plunger forwardly through said magazine section to empty the magazine and rearwardly therein to permit refilling thereof, a pug mill connected to the inlet, means for actuating the pug mill, and means for automatically interrupting the discharge of plastic material from the pug mill into the magazine when the plunger is moved forwardly through the magazine section.

WILLIAM J. MILLER.

REFERENCES CITED

The following references are of record in the file of this patent:

UNITED STATES PATENTS

| Number | Name | Date |
|---|---|---|
| 1,879,367 | Lotz | Sept. 27, 1932 |
| 1,931,371 | Bonnot | Oct. 17, 1933 |
| 1,996,930 | McClintock | Apr. 9, 1935 |
| 2,313,056 | Emerson et al. | Mar. 9, 1943 |